United States Patent [19]

Walon

[11] 4,049,466
[45] Sept. 20, 1977

[54] LEVULOSE CONTAINING SWEETENING COMPOSITIONS

[75] Inventor: Raoul Guillaume Phillipe Walon, Brussels, Belgium

[73] Assignee: CPC International Inc., Englewood Cliffs, N.J.

[21] Appl. No.: 435,388

[22] Filed: Jan. 21, 1974

Related U.S. Application Data

[63] Continuation of Ser. No. 303,581, Nov. 3, 1972, abandoned, which is a continuation of Ser. No. 42,587, June 1, 1970, abandoned.

[51] Int. Cl.² .............................................. C13K 11/00
[52] U.S. Cl. ...................................... 127/29; 127/30; 127/61
[58] Field of Search .................. 426/213, 380; 127/29, 127/30, 32

[56] References Cited

U.S. PATENT DOCUMENTS

| | | | |
|---|---|---|---|
| 2,305,940 | 9/1939 | Walsh | 127/29 X |
| 3,483,032 | 12/1969 | Stern | 127/58 |
| 3,519,482 | 7/1970 | Walon | 127/38 |
| 3,582,359 | 6/1971 | Horn | 426/660 X |

Primary Examiner—Joseph M. Golian

[57] ABSTRACT

This invention discloses a solid sweetening composition comprising from about 10 to about 50 weight percent levulose, and from about 50 to 70 weight percent of a starch hydrolysate having a dextrose equivalent between about 1 and 25 and a polysaccharide content, having a degree of polymerization greater than 4, of at least about 60 weight percent, provided that the polysaccharide content of the total composition, having a degree of polymerization greater than 4, is at least about 40 weight percent.

10 Claims, No Drawings

LEVULOSE CONTAINING SWEETENING COMPOSITIONS

This is a continuation of application Ser. No. 303,581, filed Nov. 3, 1972 which in turn is a continuation of application Ser. No. 42,587 filed June 1, 1970, now both abandoned.

This invention relates to solid sweetening compositions useful in the food and beverage industry. More specifically, this invention relates to solid sweetening compositions containing up to 50% by weight levulose.

The enzyme conversion of starch results in a variety of products having utility in the food and beverage industry. Of particular significance are the saccharification products of starch which contain substantial quantities of one or more sugars such as dextrose, maltose, levulose and the like. Typically, the sugar bearing products are in the form of syrups containing from about 15 to about 60% by weight of water. While the sugar bearing product in the form of an aqueous syrup has found widespread acceptance in the industry, there are many instances wherein a solid and substantially dry product would be preferred. Furthermore, the shipping of a product consisting of the saccharification products alone and free from the large amounts of water present in a syrup would result in considerable space saving and economic advantage.

To meet these requirements, various conversion syrups have been dehydrated to produce solid products. The degree of success of such products has in the past been dependent on the particular sugars contained in these products and their percentage in the total composition. Thus, while syrups containing large quantities of dextrose and/or maltose have been dehydrated to produce solid products which can be stored and shipped in moisture-proof bags, it has been difficult to do the same with levulose bearing products due to their strongly hydroscopic nature. As a result, high levulose bearing products have in the past predominantly been available in a syrup form only.

It has now been found that solid products containing large amounts of levulose can be prepared which can be stored and shipped by conventional means and which do not possess the degree of hygroscopicity of heretofore known products of similar levulose content. More particularly, it has been found that a solid levulose bearing powder useful in the food and beverage industries containing up to 50% by weight levulose can be prepared by utilizing a starch hydrolysate carrier described hereinafter.

The above and other advantages are realized in a solid sweetening composition comprising from about 10 to about 50 weight percent levulose and from about 50 to about 70 weight percent of a starch hydrolysate having a dextrose equivalent between about 1 and about 25 and a polysaccharide content, having a degree of polymerization greater than 4, of at least about 60 weight percent provided the polysaccharide content of the total composition, having a degree of polymerization greater than 4, is at least about 40 weight percent.

In a preferred embodiment of the present invention, the solid sweetening composit on comprises from about 20 to about 40 weight percent levulose and from about 50 to about 70 weight percent of a starch hydrolysate having a dextrose equivalent between about 1 and about 25 and a polysaccharide content, having a degree of polymerization greater than 4, of at least about 60 weight percent, provided that the polysaccharide content of the total composition having a degree of polymerization greater than 4 is at least about 40 weight percent.

The sweetening compositions of this invention can also contain a substantial proportion of dextrose in addition to the levulose and starch hydrolysate provided certain conditions are met. Thus, a further embodiment of the present invention resides in a solid sweetening composition comprising from about 10 to about 50 weight percent levulose, from about 2 to about 40 weight percent dextrose and from about 50 to about 70 weight percent starch hydrolysate having a dextrose equivalent between about 1 and about 25, and a polysaccharide content, having a degree of polymerization greater that 4, of at least about 60 weight percent, provided that the maximum combined dextrose and levulose content of the composition is about 50 weight percent and provided the polysaccharide content of the total composition, having a degree of polymerization greater than 4, is at least about 40 weight percent.

The compositions of the present invention can be prepared by spray drying an aqueous mixture of the starch hydrolysate carrier and a levulose bearing syrup, optionally containing dextrose. Spray drying generally comprises spraying the aqueous mixture of the starch hydrolysate carrier and levulose syrup in the form of finely divided particles into a heated moving air stream. The finely divided spray can be formed by atomizing the aqueous mixture utilizing a closely perforated centrifugal spinner rotated at high speeds. This centrifugal spinner, usually in the form of a revolving disk or turbine, is capable of delivering the atomized aqueous mixture into the heated air chamber which, upon drying, will result in a product having a particle size in the range of from about 5 to about 150 microns.

The spray drying conditions can vary depending upon such variables as the particular composition of the aqueous mixture, the moisture content of the final product, the particle size of the product and the like. In general, the aqueous mixture is supplied to the revolving disk or turbine rotating at a rate between about 10,000 and about 30,000 revolutions per minute and is sprayed into the heated air stream having a temperature of from about 130° to about 250° C. In some instances, particularly when the aqueous levulose and starch hydrolysate bearing syrup is of a low solids content, it can be preferred to preheat the aqueous syrup to facilitate the removal of water. Preheating temperatures such as those ranging from about 50° to about 100° C are useful while preheating temperatures ranging from about 60° to about 90° C are preferred. Under these conditions a typical spray dried product contains from about 95 to about 100% dry substance.

As indicated above, the compositions of the present invention are prepared by spray drying an aqueous mixture of a starch hydrolysate carrier and a levulose and optionally dextrose bearing syrups. The particular source of levulose (and dextrose, when used) is not critical and starting materials from several origins can be used, provided that the concentrations of levulose and dextrose are such that when mixed with the required proportions of essential components on a dry basis they fall within the limits defined above. One suitable source of levulose and dextrose is invert sugar containing about equal proportions of dextrose and levulose and prepared by the action of invertase on sucrose. Another source of starting material useful for preparing the compositions of the present invention is a product obtained upon partial or total isomerization of dextrose, often referred to as invert dextrose. A further starting material source can be the isomerization product of a starch hydrolysate having a high dextrose equivalent, such as about 60 to 90. A variety of additional starting materials, such as those obtained by synthetic blending of individual sugars or compositions as described, are also contemplated herein.

The starch hydrolysate carrier useful for preparing the compositions of the present invention are starch hydrolysates having a dextrose equivalent between about 1 and about 25 and a polysaccharide content, having a degree of polymerization greater than 5, of at least about 60 weight percent. While any starch hydrolysate having properties falling within this range can be successfully used, those starch hydrolysates having lower dextrose equivalents and a greater proportion of polysaccharides, having a degree of polymerization above 5, are preferred for those compositions of this invention containing levulose in larger proportions, such as in an amount of from about 25 to about 50% by weight of the total composition.

The starch hydrolysate carriers of the present invention can be prepared by conventional means such as acid or base hydrolysis, pyrolytic hydrolysis, enzyme conversion or a combination thereof from various starches such as corn starch, waxy maize starch, tapioca starch, potato starch, wheat starch, sago starch, arrowroot starch, rice starch and barley starch. The preferred starches for preparing the starch hydrolysate carriers of the present invention are corn starch and waxy maize starch.

In a preferred embodiment of the present invention, the starch hydrolysates have a high degree of water solubility. The use of such water soluble carriers in the compositions of this invention will result in sweetening compositions which, in turn, will be water soluble and therefore useful in a greater number of applications.

To prepare a starch hydrolysate having the required properties for preparing the sweetening compositions of this invention, an aqueous slurry of starch of a convenient concentration, usually ranging from 2 to 4 parts by weight of starch per 10 parts of water, containing from about 0.001 to about 2% by weight of enzyme such as alpha-amylase base on the starch, is heated to a temperature ranging from about 50° to about 100° C and preferably from about 70° to about 90° C for a period sufficient to result in the desired degree of conversion. The conversion is then stopped by inactivating the enzyme utilizing procedures known in the art such as increasing the temperature of the conversion mixture under superatmospheric pressure to yield the desired starch hydrolysate.

The particular temperature at which the enzyme conversion can be carried out will vary within the range set forth above, depending on the specific enzyme stabilizers or accelerators and the duration of enzyme conversion desired. The thermostability of enzymes decreases from bacterial to malt and further to fungal types. As a result the lower temperatures are used for fungal alpha-amylases and the higher temperatures for bacterial alpha-amylases while intermediary temperatures within the above ranges are most suited for malt alpha-amylases. Lower temperatures than those suited for a particular enzyme result in sluggish enzyme action, while higher temperatures result in a faster enzyme rate up to the point at which enzyme destruction overbalances this effect.

The pH at which the starch slurry is subjected to enzyme conversion will have an effect on enzyme activity. Typically, a pH range of from about 5 to about 7 can be used. While alpha-amylases, for example, exhibit increased thermal stability in the upper portion of the range set forth, a pH above about 7 becomes destructive to the enzymes. The stability of alpha-amylases can also be improved through the use of such stabilizers as calcium ion.

A starch hydrolysate suitable for the compositions of this invention can also be prepared by first subjecting a mixture of starch and water having a solids content less than about 50% by weight to the hydrolytic action of a bacterial alpha-amylase followed by a high temperature heating step to solubilize the remaining unsolubilized starch. Since high temperature heating inactivates the enzyme, this product can be subjected to a second hydrolysis by treatment with additional bacterial alpha-amylase to obtain the final starch hydrolysate having excellent water solubility within the dextrose equivalent heretofore described.

A further method of preparing the starch hydrolysates of this invention comprises hydrolyzing a mixture of starch and water by the action of acid to reach a dextrose equivalent of between 1 and about 10 and, thereafter, subjecting the hydrolysate to the action of bacterial alpha-amylase to obtain a product having a dextrose equivalent between about 10 and about 25 and having the desired degree of polymerization.

The described starch hydrolysates are used as an aqueous slurry or solution to prepare the sweetening compositions of this invention. The solids content of this slurry or solution is not critical, provided that the viscosity of the mixture with levulose bearing syrup is such that it can be conveniently spray dried. Therefore, high concentrations of both carrier and levulose in the aqueous mixture that result in exceedingly heavy syrups are not desirable. In some instances, the preheating of these syrups prior to spray drying alleviates excessive viscosity.

The manner in which the compositions of the present invention can be prepared is more specifically illustrated in the following examples.

EXAMPLE I

Preparation Of A Starch Hydrolysate Utilizing A Single Step Enzyme Conversion

An aqueous starch slurry is prepared containing 30% by weight of corn starch. The slurry is heated to a temperature of between about 85° and about 95° C, and a bacterial alpha-amylase preparation is added to an amount of about 0.025% by weight of the starch over a period of about 30 minutes. The mixture is then stirred for a period of about 30 minutes while maintaining the temperature between about 80° and about 90° C. After this time the temperature is reduced to 80° C, and the enzyme conversion is carried out until the desired dextrose equivalent is reached. The temperature of the mixture is then quickly raised to about 120° C to inactivate the enzyme and terminate the conversion.

Typical starch hydrolysates which can be prepared by the method described in Example I are shown in Table 1, wherein D.E. designates dextrose equivalent, $DP_1$ designates a total quantity in percent by weight of monosaccharides present in the starch hydrolysate, $DP_2$ designates the total quantity of disaccharides present in the starch hydrolysate and so forth.

Table 1

| Starch Hydrolysate No. | 1 | 2 | 3 | 4 | 5 |
|---|---|---|---|---|---|
| D.E. | 5.0 | 10.0 | 15.0 | 20.0 | 25.0 |
| $DP_1$ | 0.1 | 0.3 | 0.7 | 1.4 | 2.4 |
| $DP_2$ | 1.3 | 3.4 | 5.3 | 7.6 | 9.7 |
| $DP_3$ | 1.8 | 4.3 | 6.9 | 9.4 | 12.0 |
| $DP_4$ | 1.8 | 3.5 | 5.2 | 6.9 | 8.6 |
| $DP_5$ | 1.8 | 3.6 | 5.5 | 7.4 | 9.3 |
| $DP_6$ | 3.3 | 7.0 | 10.6 | 14.3 | 18.0 |
| $DP_7$ and higher | 89.9 | 77.9 | 65.6 | 53.0 | 40.0 |

EXAMPLE II

Preparation Of A Starch Hydrolysate Utilizing A Two Step Enzyme Conversion

Unmodified corn starch is slurried in water to provide an aqueous suspension containing from about 28 to about 32% by weight of the starch. Bacterial alpha-amylase (HT-1000; a product manufactured and sold by Miles Chemical Laboratories) is added to the aqueous suspension in an amount of about 0.05% by weight based on starch. The starch suspension is then heated with agitation at a temperature of about 90° C for a period of about 10 minutes to inactivate the enzyme and terminate the conversion. After this time the conversion product is cooled and filtered and a second quantity of alpha-amylase in an amount of about 0.02% by weight based on starch solids is added to the liquified starch. The resulting mixture is then heated for a period of about 1: to about 20 hours at a temperature from about 80 to about 85° C to result in the desired starch hydrolysate. A typical starch hydrolysate prepared by the procedure of this example has a dextrose equivalent of about 20 and a degree of polymerization of 7 and greater of about 50% by weight.

EXAMPLE III

Preparation Of A Starch Hydrolysate Utilizing A Two Step Acid-Enzyme Conversion

Corn starch is slurried in water until the resulting suspension has obtained a Baume ranging from about 14 to about 22°. This suspension is partially acid hydrolyzed to a dextrose equivalent of about 10 to about 15. The acid hydrolyzed slurry is then adjusted to a pH between about 6 and about 7, the resulting liquor is maintained at a temperature of about 80° and about 85° C, and bacterial alpha-amylase (HT-1000) is added to a quantity of from about 0.01 to about 0.1% by weight of the resulting mixture, is stirred while maintaining the temperature for a period of from about 1 to about 2 hours to result in a desired starch hydrolysate of the present invention. A starch hydrolysate prepared by the method of this example has a final dextrose equivalent of from about 18 to about 25 and a degree of polymerization of 7 or more of from about 40 to about 60% by weight.

EXAMPLE IV

Preparation Of A Solid Sweetening Composition

An aqueous syrup containing 18% by weight levulose, 63% by weight dextrose and having a dextrose equivalent of about 89 and a solids content of 80% was mixed with a starch hydrolysate having a dextrose equivalent of 20.5 and a solids content of 70% and a degree of polymerization of 5 of at least about 60% by weight to yield an aqueous mixture having a 75.5% by weight solids content, a levulose content on a dry basis of about 10% and a dextrose equivalent of about 58.4. This aqueous mixture was preheated to a temperature of about 80° C and was spray dried in a heated moving-air chamber having an air inlet temperature of about 130° C and an air and product exit temperature of about 60° C, and equipped with a turbine spray head revolving at about 22,000 rpm to yield the desired product as a white powder having the following properties:

Moisture content — 2.5%
Dry substance — 97.5%
Dextrose equivalent — 58.6
Dextrose content — 40.4%
Levulose content — 9.8%

EXAMPLE V

Preparation Of A Solid Sweetening Composition

Invert sugar syrup having a solids content of 79.8%, a dextrose equivalent of 97.8, a dextrose content of 48.4% on a dry basis and a levulose content of 49% on a dry basis, was mixed with an aqueous starch hydrolysate having a 70% solids content, a dextrose equivalent of 20.4, a dextrose content of 5% to yield an aqueous mixture having a solids content of 74.2%, a levulose content on a dry basis of 19.8% and a dextrose content on a dry basis of 24.1%. This mixture was preheated to a temperature of about 84° C and was spray dried in a moving-air chamber having an air inlet temperature of about 160° C and an air and product exit temperature of about 83° C and equipped with a turbine spray head revolving at about 35,000 rpm to yield the desired product as a white powder having the following properties:

Moisture content — 1.9%
Dextrose equivalent — 53.1
Dextrose content — 23.6%
Levulose content — 20.0%

A variety of additional sweetening compositions of the present invention can be prepared by the procedures detailed in the foregoing examples. In the following examples are given the proportions of the essential starting materials required to prepare the sweetening compositions having the indicated set of properties.

EXAMPLE VI

An aqueous mixture of levulose powder (30 weight percent on a dry basis) and a starch hydrolysate having a dextrose equivalent of 20 (70 weight percent on a dry basis) was spray dried in an air chamber having an air inlet temperature of 170° C and an air and product exit temperature of 85° C to yield a sweetening composition having the following properties:

Dry substance — 98.9%
Dextrose equivalent — 45.1
Dextrose content — 3.5%
Levulose content — 30.0%
Maltose content — 4.4%
Polysaccharides having a degree of polymerization above 4 — 47.0%
pH — 6.7

EXAMPLE VII

An aqueous mixture of invert sucrose (33 weight percent; a 1:1 ratio of dextrose and levulose) and starch hydrolysate having a dextrose equivalent of 20 (67 weight percent) was spray dried in a forced air chamber having an air inlet temperature of about 170° C and an air and product exit temperature of 94° C, to yield a sweetening composition having the following properties:
- Dry substance — 98.6%
- Dextrose equivalent — 49.6
- Dextrose content — 23.0%
- Levulose content — 18.1%
- Maltose content — 5.0%
- Polysaccharides having a degree of polymerization above 4 — 40.0%
- pH — 5.0

EXAMPLE VIII

An aqueous mixture of invert sucrose (40 weight percent; a 1:1 ratio of dextrose and levulose) and starch hydrolysate having a dextrose equivalent of 20 was spray dried in a forced air chamber having an air inlet temperature of about 160° C and an air and product exit temperature of about 91° C to yield a powdered sweetening composition having the following properties:
- Dry substance — 98.1%
- Dextrose equivalent — 55.5
- Dextrose content — 27.7%
- Levulose content — 20.0%
- Maltose content — 4.2%
- Polysaccharides having a degree of polymerization above 4 — 37.7%
- pH — 4.9

EXAMPLE IX

An aqueous mixture of invert sucrose (20 weight percent on a dry basis; a 1:1 ratio of dextrose and levulose) and starch hydrolysate having a dextrose equivalent of 20 (80 weight percent on a dry basis) was spray dried in a forced air chamber having an air inlet temperature of about 162° C and an air and product exit temperature of about 85° C to yield a powdered sweetening composition having the following properties:
- Dry substance — 98.8%
- Dextrose equivalent — 37.7
- Dextrose content — 15.0%
- Levulose content — 12.0%
- Maltose content — 5.5%
- Polysaccharides having a degree of polymerization above 4 — 58.4%
- pH — 5.0

EXAMPLE X

An aqueous mixture of invert dextrose (50 weight percent on a dry basis) and starch hydrolysate (50 weight percent on a dry basis) having a solids content of 72 weight percent and a total dextrose equivalent of 56.4 was air dried in a forced air chamber having an air inlet temperature of 170° C and an air and product exit temperature of 95° C, to yield a powdered sweetening composition having the following properties:
- Dry substance — 98.8%
- Dextrose equivalent — 56.8
- Dextrose content — 33.0%
- Levulose content — 15.0%
- Maltose content — 1.5%
- Polysaccharides having a degree of polymerization above 5 — 45.0%

EXAMPLE XI

An aqueous mixture of levulose powder (50 weight percent on a dry basis) and starch hydrolysate having a dextrose equivalent of 9 (50 weight percent on a dry basis) of a total solids content of 68 weight percent and a dextrose equivalent of 67 was spary dried in a forced air chamber having an air inlet temperature of about 80° C to yield a powdered sweetening composition having the following properties:
- Dry substance — 98.2%
- Dextrose equivalent — 53.9
- Dextrose content — 26.0%
- Levulose content — 25.0%
- Maltose content — 1.5%
- Polysaccharides having a degree of polymerization above 5 — 43.0%

EXAMPLE XII

An aqueous mixture of levulose powder (40 weight percent on a dry basis) and starch hydrolysate having a dextrose equivalent of 12 (60 weight percent on a dry basis) having a total solids content of 73% and a dextrose equivalent of 47 was spray dried in a forced air chamber having an air inlet temperature of about 160° C and an air and product exit temperature of about 74° C to yield a powdered sweetening composition having the following properties:
- Dry substance — 96.6%
- Dextrose equivalent — 47.0
- Dextrose content — 0.6%
- Levulose content — 40.0%
- Maltose content — 1.6%
- Polysaccharides having a degree of polymerization above 5 — 49.7%

EXAMPLE XIII

An aqueous mixture of powdered levulose (50 weight percent on a dry basis) and starch hydrolysate having a dextrose equivalent of 3 (50 weight percent on a dry basis) having a solids content of 59.0% and a total dextrose equivalent of 52.6 was spray dried in a forced air chamber having an air inlet temperature of about 170° C and an air and product exit temperature of 85° C to yield a powdered sweetening composition having the following properties:
- Dry substance — 98.7%
- Dextrose equivalent — 52.7
- Levulose content — 50.0%

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. A solid sweetening composition comprising from about 10 to about 50 weight percent levulose and from about 50 to about 70 weight percent of a starch hydrolysate having a high degree of water solubility, having a dextrose equivalent between about 1 and about 25 and a polysaccharide content, having a degree of polymerization greater than 4, of at least about 60 weight percent, provided the polysaccharide content of the total composition having a degree of polymerization greater than 4 is at least about 40 weight percent.

2. The solid sweetening composition of claim 1 comprising from about 20 to about 40 weight percent levulose and from about 50 to about 70 weight percent starch hydrolysate having a dextrose equivalent between about 1 and about 25 and a polysaccharide content, having a degree of polymerization greater than 4, of at least about 60 weight percent, provided that the polysaccharide content of the total composition having a degree of polymerization greater than 4 is at least about 40 weight percent.

3. A solid sweetening composition of claim 1 comprising from about 10 to about 50 weight percent levulose, from about 2 to about 40 weight percent dextrose and from about 50 to about 70 weight percent of a starch hydrolysate having a dextrose equivalent between about 1 and about 25 and a polysaccharide content, having a degree of polymerization greater than 4, of at least about 60 weight percent, provided that the maximum combined dextrose and levulose content of the composition is about 50 weight percent and provided the polysaccharide content of the total composition, having a degree of polymerization greater than 4 is at least about 40 weight percent.

4. The product of claim 1, wherein said levulose is derived from invert sugar containing substantially equal portions of dextrose and levulose and prepared by the action of invertase on sucrose.

5. The product of claim 1, wherein said levulose is derived from the partial or total isomerization of dextrose to obtain a levulose-bearing syrup.

6. The product of claim 1, wherein said starch hydrolysate has a dextrose content in the range of from about 0.1% to about 2.4% by weight and a maltose content in the range of from about 1.3% to about 9.7% by weight and a dextrose equivalent value in the range of from about 5 to about 25.

7. A process for the preparation of a solid sweetening composition which comprises a. spray-drying an aqueous mixture comprising, on a solids basis, from about 10 to about 50 weight percent levulose, and from about 50 to about 70 weight percent starch hydrolysate having a dextrose equivalent between about 1 and about 25 and a polysaccharide content, having a degree of polymerization greater than about 4, of at least about 60 weight percent provided that the polysaccharide content of the aqueous mixture on a dry basis having a degree of polymerization greater than about 4 is at least about 40 weight percent; and b. recovering a solid sweetening composition having a high degree of water solubility.

8. A process for the preparation of a solid sweetening composition which comprises:

a. spray-drying an aqueous mixture comprising, on a solids basis, from about 10 to about 50 weight percent levulose, from about 2 to about 40 weight percent dextrose and from about 50 to about 70 weight percent starch hydrolysate having a dextrose equivalent between about 1 and about 25 and a polysaccharide content having a degree of polymerization greater than about 4, of at least about 60 weight percent provided that the maximum combined dextrose and levulose content of the aqueous mixture is about 50 weight percent and provided that the polysaccharide content of the aqueous mixture on a dry basis having a degree of polymerization greater than about 4, is at least about 40 weight percent; and b. recovering a solid sweetening composition having a high degree of water solubility.

9. The process of claim 7, wherein spray-drying comprises spraying the aqueous mixture into a heated moving air stream having a temperature from about 130° C to about 250° C.

10. The process of claim 9, wherein the aqueous mixture is heated to a temperature from about 50° C to about 100° C. prior to spraying.